Jan. 21, 1930.                P. KAISLER                1,744,121
                             SAFETY NUT LOCK
                          Filed Dec. 19, 1927

Inventor:
Paul Kaisler

Patented Jan. 21, 1930

1,744,121

UNITED STATES PATENT OFFICE

PAUL KAISLER, OF BERLIN, GERMANY

SAFETY NUT LOCK

Application filed December 19, 1927, Serial No. 241,198, and in Germany December 20, 1926.

This invention relates to improvements in nut locks, the object of the invention being to provide improved nut locking devices which are simple and cheap in construction, which may be readily installed in a nut, which require only the provision of a channel in the nut for the installation of the nut locking devices and by means of which a nut may be securely locked against reverse movement after it has been tightened on a bolt and which also permits of the unscrewing of the nut without destruction of or injury to the nut locking devices when this is desired.

With the above and other objects in view, the invention consists in the construction, combination and arrangement of devices hereinafter described and claimed.

Figure 1:
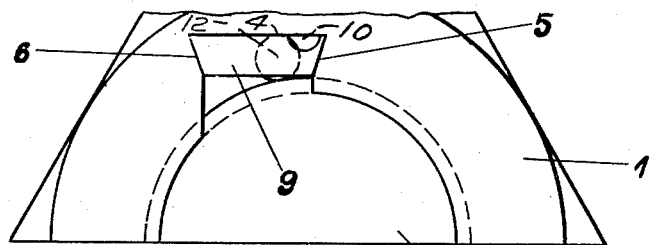
Figure 1 is a plan of a nut and bolt provided with nut locking devices constructed and arranged in accordance with this invention.
Figure 2:
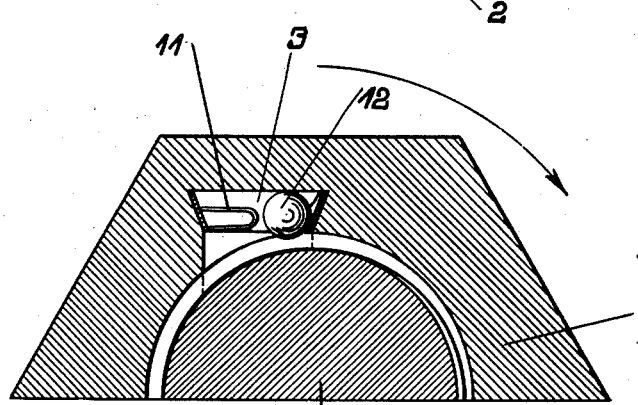
Figure 2 is a section perpendicular to the line A—B of the Figure 3.
Figure 3:
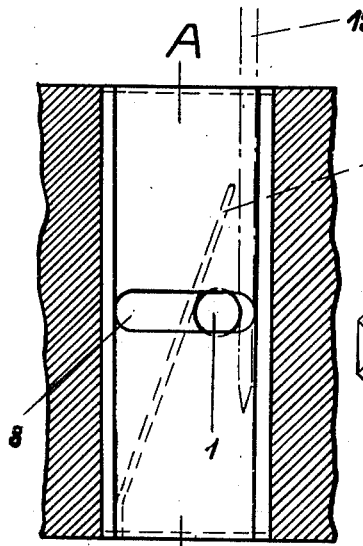
Figure 3 is a side view of the casing.
Figure 4:
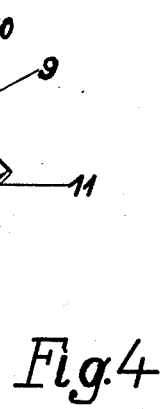
Figure 4 is a perspective sight of the casing.

Parallel to the axle of the nut 1 there is a channel or recess 3 which is open against the bolt 2 and forms walls 4, 5, and 6 which are parallel to the outer side of the nut. The ball 12 is arranged in a casing 7 which is so constructed as to fit exactly into the channel 3. The ball 12 is movable transversely of the casing and in a transverse slot 8 with which the wall of the casing presented to the bolt thread is provided. In the end walls 9 of the casing are openings 10 for the reception of a needle or the like by means of which the ball may be manually moved out of engagement with the thread in order to permit the nut to be unscrewed.

A spring 11 presses the ball toward one end of the slot 8. If the nut is turned in the reverse direction to that indicated by the arrow, the ball is moved into the radially narrowed portion of the channel and hence is caused to exert such a pressure upon the thread of the bolt that further turning in such direction is impossible. But if the nut is turned in the direction indicated by the arrow the ball is caused to move, against the pressure of the spring, out of engagement with the bolt thread and hence the nut may be loosened on the bolt or removed therefrom, as may be desired. But in order to turn the nut 1 in the direction required to release it from the bolt a needle 13 or the like must first be introduced through one of the openings 10 in the ends of the casing and manipulated so as to move the ball from engagement with the thread of the bolt as will be understood.

The operation of my improved nut locking device is positive and the same effectually prevents reverse turning of the nut.

Having now particularly ascertained and described the nature of my invention and in what manner it is to be performed I declare that what I claim is:

In a nut lock, a nut having a recess open on the threads thereof, a casing in said recess open on the side away from the threads and having a side adjacent the threads provided with a transverse slot and having walls provided with openings for the reception of a needle or the like, a ball in said casing engaging in and guided and restrained by the slot at the outer side of said casing and adapted to engage the threads of a bolt on which the nut is screwed, and a spring active to press the ball into thread engaging position, said spring extending diagonally lengthwise in the casing and having its ends secured to one end of the casing.

In testimony whereof I affix my signature.

PAUL KAISLER.